(12) United States Patent
Agarwal et al.

(10) Patent No.: US 6,438,663 B1
(45) Date of Patent: Aug. 20, 2002

(54) SYSTEM AND METHOD FOR IDENTIFYING SHARED VIRTUAL MEMORY IN A COMPUTER CLUSTER

(75) Inventors: Vinod K. Agarwal, Naperville, IL (US); Mounish S. Desai, Columbia, SC (US)

(73) Assignee: Steeleye Technology, Inc., Mountain View, CA (US)

( * ) Notice: Subject to any disclaimer, the term of this patent is extended or adjusted under 35 U.S.C. 154(b) by 0 days.

(21) Appl. No.: 08/763,912

(22) Filed: Dec. 11, 1996

(51) Int. Cl.[7] ............................................. G06F 13/16
(52) U.S. Cl. .......................... 711/148; 710/16; 710/8; 710/10; 710/11; 711/147; 711/112
(58) Field of Search .................................. 711/147, 148, 711/149, 150, 151, 153, 154, 112; 395/200.43, 200.44, 200.45, 608; 710/220, 11, 79, 109, 16, 8, 10; 709/214

(56) References Cited

U.S. PATENT DOCUMENTS

| | | | | |
|---|---|---|---|---|
| 4,914,577 A | * | 4/1990 | Stewart et al. | 711/207 |
| 4,980,818 A | * | 12/1990 | Shinmura | 711/147 |
| 5,369,758 A | * | 11/1994 | Larson et al. | 714/7 |
| 5,655,148 A | * | 8/1997 | Richman et al. | 710/8 |
| 5,675,781 A | * | 10/1997 | Duncan et al. | 707/8 |

* cited by examiner

*Primary Examiner*—B. James Peikari
(74) *Attorney, Agent, or Firm*—Nelson Mullins Riley & Scarborough

(57) ABSTRACT

For use with a computer cluster having virtual memory logical devices associated therewith, a system and method for determining which of the virtual memory logical devices are shared devices and a computer cluster employing such system or method. The system includes: (1) a polling circuit that retrieves volume information from at least some of the virtual memory logical devices and (2) a matching circuit that determines which ones of the at least some of the virtual memory logical devices are shared devices as a function of the volume information.

20 Claims, 3 Drawing Sheets

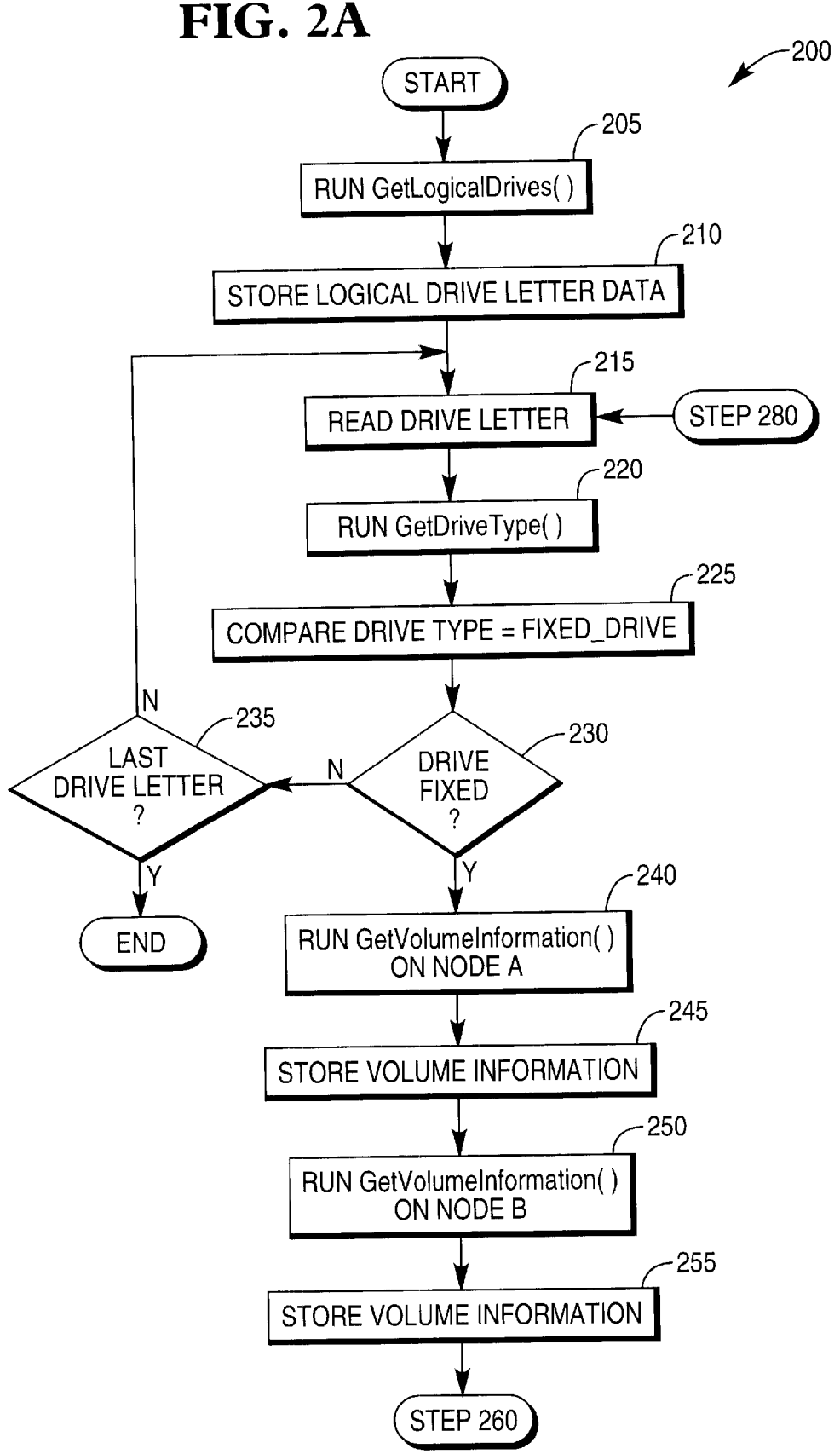

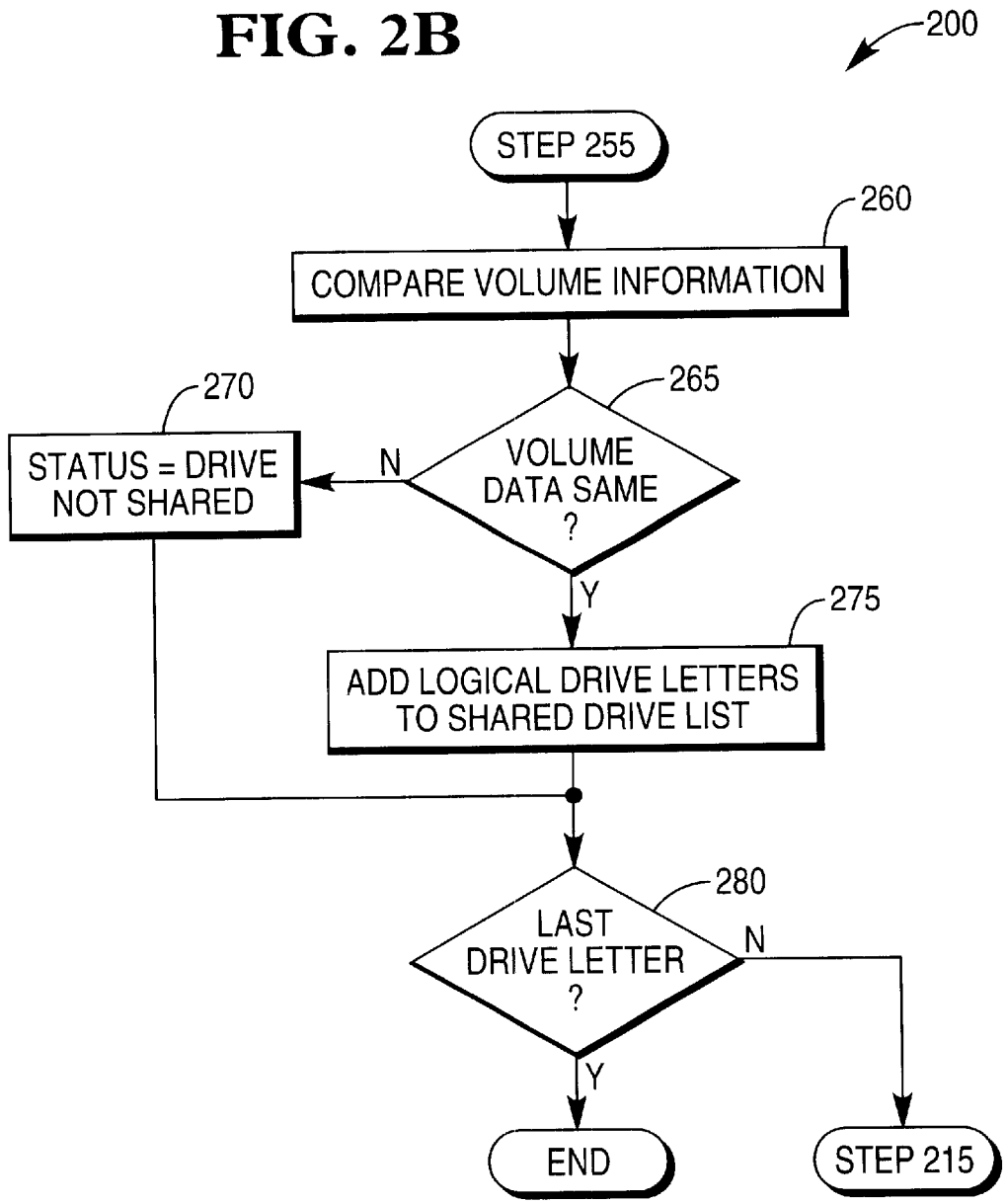

SYSTEM AND METHOD FOR IDENTIFYING SHARED VIRTUAL MEMORY IN A COMPUTER CLUSTER

TECHNICAL FIELD OF THE INVENTION

The present invention is directed, in general, to a computer system and, more specifically, to a system and method for identifying shared virtual memory (such as volumes of disk storage) in a cluster of cooperating computer systems.

BACKGROUND OF THE INVENTION

Computer "clusters" comprising two or more processing devices and one or more associated storage devices are a very common and useful system configuration. Clusters provide highspeed communication between, and share resources among, the processing systems, storage devices and/or peripheral devices. The ability of clustered computer systems to share resources, in particular to share memory storage devices, is one of the key advantages of computer clusters.

Frequently, the fixed disk drives in a computer cluster are divided into volumes. The disk volumes may be shared by more than one device in the cluster, or may be non-shared. This distinction is not readily apparent to a user, since drives are usually addressed by a logical drive letter. The user thus has no way of determining whether or not a logical drive letter is assigned to the same volume on all systems in the cluster. This is a disadvantage in those applications where it is important to know whether or not a resource is shared by one or more devices. For example, if individual copies of a database application are resident in two servers and the database for the application is stored in a shared memory volume, either server can access the database even if the other server is malfunctioning or off-line for routine maintenance. However, if the database was stored in non-shared memory associated with a first one of the servers, the remaining server can access the database only by communicating with the first server.

Accordingly, what is needed in the art is a system and method that allows a user to determine which of the disk volumes in a complex cluster are shared between machines in the cluster.

SUMMARY OF THE INVENTION

To address the above-discussed deficiencies of the prior art, the present invention provides, for use with a computer cluster having virtual memory logical devices associated therewith, a system and method for determining which of the virtual memory logical devices are shared devices and a computer cluster employing such system or method. The system includes: (1) a polling circuit that retrieves volume information from at least some of the virtual memory logical devices and (2) a matching circuit that determines which ones of the at least some of the virtual memory logical devices are shared devices as a function of the volume information.

As previously described, it is difficult to determine, in a complex computer cluster, which virtual memory logical devices are shared. This is so because conventional operating systems, such as Windows® NT®, do not provide a direct way to determine whether a device is shared. The present invention introduces the concept of employing the volume information that is conventionally associated with the virtual memory logical devices to determine (by deduction) which ones of the virtual memory logical devices are shared devices. Because it is highly unlikely (supporting mathematics to follow) that two devices would ever have the same volume information, the likelihood that the present invention is correct in its determination is correct, for all practical purposes.

In one embodiment of the present invention, the polling circuit retrieves the volume information as a function of drive letters that are common to computer systems in the computer cluster. In the embodiment to be illustrated and described, the polling circuit retrieves drive letters (e.g., "C:" in DOS-based computer systems) corresponding to devices of each computer system. In one embodiment of the present invention, the polling circuit retrieves the volume information from virtual memory logical devices that are available to the at least some of the virtual memory logical devices. In the embodiment to be illustrated and described, only available virtual fixed disk drive devices are polled for volume information.

In one embodiment of the present invention, the volume information is selected from the group consisting of: (1) volume name, (2) serial number, (3) maximum file length, (4) file system flags and (5) file system name. Those skilled in the art will readily perceive, however, that other information pertaining to a given virtual memory logical device can be retrieved for the purposes of determining whether the given device is shared.

In one embodiment of the present invention, the at least some of the virtual memory logical devices are fixed disk drives and the computer cluster is under control of a flat operating system. A "flat operating system" is one that does not divide memory into segments. Almost all modern operating systems are flat, using paging techniques to manage memory. This allows the operating systems to employ virtual memory management wherein volatile and nonvolatile main memory and nonvolatile secondary storage (such as disk drives) are addressed in a unified scheme.

In one embodiment of the present invention, the computer cluster is under control of a Windows® NT® operating system, the polling circuit employing Windows® NT® operating system commands selected from the group consisting of: (1) GetLogicalDrives( ), (2) GetDriveType( ) and (3) GetVolumeInformation( ). Those skilled in the art are familiar with these commands as they are typically employed, but will understand that use of these commands to deduce whether a device is shared has been heretofore unknown.

In one embodiment of the present invention, the operating system employs the plurality of logical fixed disk drives as virtual memory. Once it is known which of the logical fixed disk drives are shared, the operating system can more efficiently employ the resources of the computer cluster to execute a task on specific computer systems within the cluster.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIGS. 2A and 2B collectively illustrate a flow diagram of an exemplary method for determining which of the disk volumes in a network cluster are shared between machines in the cluster according to one embodiment of the present invention.

DETAILED DESCRIPTION

Figure 1:
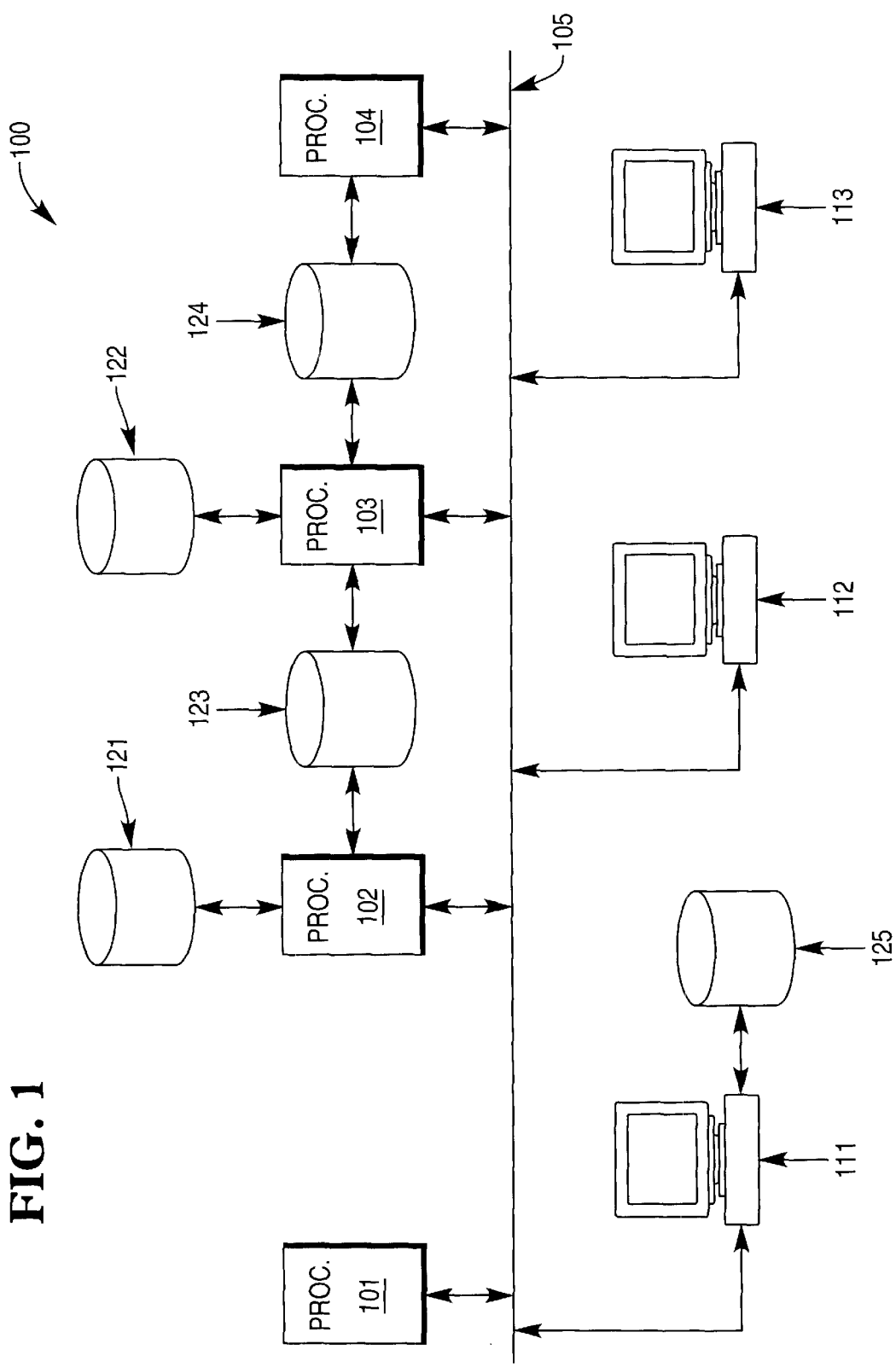
FIG. 1 illustrates a block diagram of an exemplary computer network cluster according to one embodiment of the present invention.

Referring initially to FIG. 1, illustrated is a block diagram of an exemplary computer network cluster according to one embodiment of the present invention. A computer system 100 is illustratively provided and includes processing units 101–104, personal computer (PC) stations 111–113 and disk storage devices (disk drives) 121–125. The term "include" and its derivatives, as used herein, mean inclusion without limitation.

Processing units 101–104 may be server computers or PC workstations similar to PC 111–PC 113. Processing units 101–104, disk storage devices 121–125 and PC 111–PC 113 comprise a complex cluster and share resources and communicate with one another via communication link 105. Additionally, processing units 102–104 and disk storage devices 121–124 may comprise a separate complex cluster. Communication link 105 may be any one of a number of widely used network links, including Fiber Distributed Data Interface (FDDI). Computer network 100 is configured as a bus topology, such as Ethernet, but may also be configured as other topologies, including token ring or star.

In a preferred embodiment, computer network 100 advantageously uses a Small Computer Systems Interface (SCSI) adapter to couple the disk drives to the processing unit and PC interfaces. SCSI adapters allow disk drives and processing units to be daisy-chained together, such as disk drives 123 and 124 and processing units 102–104. This is particularly important as a cluster grows. As FIG. 1 indicates, disk drive 121 is a local drive associated with processing unit 102, disk drive 122 is a local drive associated with processing unit 103, and disk drive 125 is a local drive associated with PC 111. Disk drive 123 is associated with processing units 102 and 103 and disk drive 124 is associated with processing units 103 and 104. Although the disk drives are not coupled directly to communication link 105, disk drives 121–125 may nonetheless be accessed by other network devices through one of the processing units or personal computers to which each disk drive is connected.

As stated above, in a complex cluster, it is difficult for a user to determine which logical drive letters correspond to shared disk volumes, since different drive letters may be used by different processing units and/or PCs to represent the same shared disk volume. The present invention provides a means for determining which disk volumes in a cluster are shared by using the volume drive information to identify shared resources. In one embodiment, processing units 101–104 include one or more registers that are used as a polling circuit to retrieve volume information from the virtual memory logical devices and (2) processing circuitry that is used as a matching circuit to determine which ones of the virtual memory logical devices are shared devices by comparing the volume information.

In one embodiment of the present invention, the virtual memory logical devices are fixed disk drives, such as disk drives 121–125 and the computer cluster is under control of a flat operating system. A "flat operating system" is one that does not divide memory into segments. Flat operating systems use paging techniques to manage memory, thereby allowing the operating systems to employ virtual memory management wherein volatile and nonvolatile main memory and nonvolatile secondary storage (such as disk drives) are addressed in a unified scheme.

In one embodiment of the present invention, the computer cluster is under control of a Windows® NT® operating system, the polling circuit employing Windows® NT® operating system commands selected from the group consisting of: (1) GetLogicalDrives( ), (2) GetDriveType( ) and (3) GetVolumelnformation( ). Those skilled in the art are familiar with these commands as they are typically employed, but will understand that use of these commands to deduce whether a device is shared has been heretofore unknown.

In a preferred embodiment, the volume information includes volume name, serial number, maximum file length, file system flags and the file system name for each volume. The volume serial number is a unique identifier assigned by the operating system when the disk is formatted. It is a random 32-bit binary number, resulting in $2^{32}=4,294,967,296$ different values. If the volume information, including the volume serial number, of two or more disk volumes used by separate devices is identical, then present invention determines that the disk volumes are actually a single shared volume and the volume is added to the list of shared disk drives. Since the probability that two nonshared volumes will have the same randomly selected serial number is approximately 1 in 4.3 billion, it is highly unlikely that this determination by the present invention will be wrong.

In an exemplary embodiment, processing unit 102 and processing unit 103 both retrieve logical drive letters from disk drive 123. For example, in a DOS operating system, logical drive letters A:, B:, and C: may be associated with processing unit 102 and drive letters E:, F:, and G: may be associated with processing unit 103. Upon running GetVolumelnformation( ) upon each drive letter, it is determined that drive letter B: and drive letter G: have identical volume information, including the same volume serial numbers. It may then be safely determined by processing units 102 and 103, and by the system administrator that logical drive letter B: and logical drive letter G: correspond to the same volume in shared disk space.

Conventional computer system architecture is more fully discussed in *The Indispensable PC Hardware Book*, by Hans-Peter Messmer, Addison Wesley (2nd ed. 1995) and *Computer Organization and Architecture*, by William Stallings, MacMillan Publishing Co. (3rd ed. 1993); conventional computer, or communications, network design is more fully discussed in *Data Network Design*, by Darren L. Spohn, McGraw-Hill, Inc. (1993); conventional data communications is more fully discussed in *Voice and Data Communications Handbook*, by Bud Bates and Donald Gregory, McGraw-Hill, Inc. (1996), *Data Communications Principles*, by R. D. Gitlin, J. F. Hayes and S. B. Weinstein, Plenum Press (1992) and *The Irwin Handbook of Telecommunications*, by James Harry Green, Irwin Professional Publishing (2nd ed. 1992); and conventional circuit design is more fully discussed in *The Art of Electronics*, by Paul Horowitz and Winfield, Cambridge University Press (2nd ed. 1991). Each of the foregoing publications is incorporated herein by reference for all purposes.

FIGS. 2A and 2B collectively illustrate a flow diagram of an exemplary method implemented by processing units 101–104 for determining which of the disk volumes in a network cluster are shared between machines in the cluster, and, more particularly, for identifying shared disk volumes and the logical drive letters corresponding to the shared volumes, all according to one embodiment of the present invention. Each of a remote system and a local system in the network cluster obtains and stores a list of available fixed drives (Steps 205 and 210). In a Windows NT environment, this would be accomplished by using the GetLogicalDrives( ) command, which generates a list of drive letters. The drive letter information is read and the GetDriveType( ) command is used to determine whether or not a selected logical drive is a fixed drive (Steps 215 and 220). If the drive is not a fixed drive, the drive is ignored and the next drive letter is read, until each drive letter has been examined (Steps 230, 235, and 215).

If, however, a drive is a fixed drive, each system uses the GetVolumeInformation( ) command to obtain and store the volume information for each logical drive, i.e., volume name, serial number, maximum file length, file system flags and file system name for each disk volume (Steps 240, 245, 250 and 255). Next, the volume information for all of the disk volumes is examined to see if any volumes have identical volume information (Steps 260 and 265). If the volume information is different, then the disk volumes are not shared (Steps 270) and the disk volume is further ignored. If the volume information is identical, the logical drive letters are added to the list of shared drives (Steps 275). The process is repeated until all combinations of logical drive letters have been compared (Steps 280 and 215).

From the above, it is apparent that the present invention provides, for use with a computer cluster having virtual memory logical devices associated therewith, a system and method for determining which of the virtual memory logical devices are shared devices and a computer cluster employing such system or method. An exemplary system includes: (1) a polling circuit that retrieves volume information from at least some of the virtual memory logical devices and (2) a matching circuit that determines which ones of the at least some of the virtual memory logical devices are shared devices as a function of the volume information.

Although the present invention has been described in detail, those skilled in the art should understand that they can make various changes, substitutions and alterations herein without departing from the spirit and scope of the invention in its broadest form.

What is claimed is:

1. For use with a computer cluster having a plurality of computer systems and a plurality of virtual memory logical devices, a system that determines which of said virtual memory logical devices are shared devices, comprising:

a polling circuit that retrieves volume information from at least some of said virtual memory logical devices as a function of drive letters that are common to computer systems in said computer cluster; and a matching circuit that compares volume information corresponding to at least two of said drive letters and determines as a function of said volume information which ones of said at least some of said virtual memory logical devices are shared devices that are simultaneously connected to and selectively accessible by at least two of said computer systems.

2. The system as recited in claim 1 wherein said polling circuit retrieves said volume information from virtual memory logical devices that are available to said polling circuit via a network.

3. The system as recited in claim 1 wherein said volume information is selected from the group consisting of:
volume name,
serial number,
maximum file length,
file system flags, and
file system name.

4. The system as recited in claim 1 wherein said at least some of said virtual memory logical devices are fixed disk drives.

5. The system as recited in claim 1 wherein said computer cluster is under control of a flat operating system.

6. The system as recited in claim 5 wherein said flat operating system uses paging techniques to access said virtual memory logical drives.

7. For use with a computer cluster having a plurality of computer systems and a plurality of virtual memory logical devices, a method of determining which of said virtual memory logical devices are shared devices, comprising the steps of:

retrieving volume information from at least some of said virtual memory logical devices as a function of drive letters that are common to computer systems in said computer cluster; and comparing volume information corresponding to at least two of said drive letters and thereby determining as a function of said volume information which ones of said at least some of said virtual memory logical devices are shared devices that are simultaneously connected to and selectively accessible by at least two of said computer systems.

8. The method as recited in claim 7 wherein said step of retrieving comprises the step of retrieving said volume information from virtual memory logical devices that are available to said polling circuit via a network.

9. The method as recited in claim 7 wherein said step of retrieving comprises the step of retrieving volume information selected from the group consisting of:
volume name,
serial number,
maximum file length,
file system flags, and
file system name.

10. The method as recited in claim 7 wherein said step of retrieving comprises the step of retrieving said volume information from fixed disk drives.

11. The method as recited in claim 7 further comprising the step of controlling said computer cluster with a flat operating system.

12. The method as recited in claim 11 wherein the flat operating system uses paging techniques to access said virtual memory logical drives.

13. A computer cluster, comprising:

an interconnected plurality of computer systems under control of an operating system that allows said plurality of computer systems to cooperate to execute a task concurrently;

a selectively sharable plurality of logical fixed disk drives coupled to said computer cluster; and a system that determines which of said plurality of logical fixed disk drives are actually shared so as to be simultaneously connected to and 'selectively accessible by at least two of said computer systems, including:

a polling circuit that queries said plurality of computer systems for lists of drive identifiers corresponding to said plurality of logical fixed disk drives; and a matching circuit that compares said lists to determine which of said drive identifiers are common to said plurality of computer systems, said polling circuit querying said logical fixed drives that correspond to said common drive identifiers for volume information pertaining thereto, said matching circuit comparing said volume information to determine which ones of said logical fixed disk drives are actually shared.

14. The cluster as recited in claim 13 wherein said drive identifiers are drive letters.

15. The cluster as recited in claim 13 wherein said polling circuit retrieves said volume information from logical fixed disk drives that are available to said plurality of computer systems via a network.

16. The cluster as recited in claim 13 wherein said volume information is selected from the group consisting of:

volume name, serial number, maximum file length, file system flags, and file system name.

17. The cluster as recited in claim 13 wherein said operating system employs said plurality of logical fixed disk drives as virtual memory.

18. The cluster as recited in claim 13 wherein said operating system is a flat operating system that uses paging techniques to access said virtual memory logical drives.

19. A method of determining which of a plurality of virtual logical memory devices in a computer cluster having at least two computer systems are simultaneously connected to and accessible by both of said computer systems, said method comprising steps of:

(a) retrieving first volume information including at least a volume serial number for each of said virtual logical memory devices associated with a first computer system of said at least two computer systems;

(b) retrieving second volume information including at least a volume serial number for each of said virtual logical memory devices associated with a second computer system of said at least two computer systems; and (c) comparing said first volume information with said second volume information to determine matches indicating that a corresponding virtual logical memory device is shared.

20. A method as recited in claim 19 wherein said volume information is retrieved as a function of drive letters that are common to computer systems in said computer cluster.

* * * * *